Patented June 24, 1952

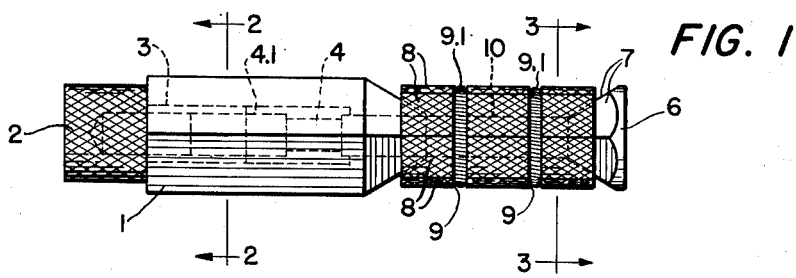
FIG. 1
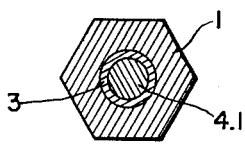
FIG. 2
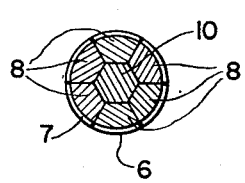
FIG. 3
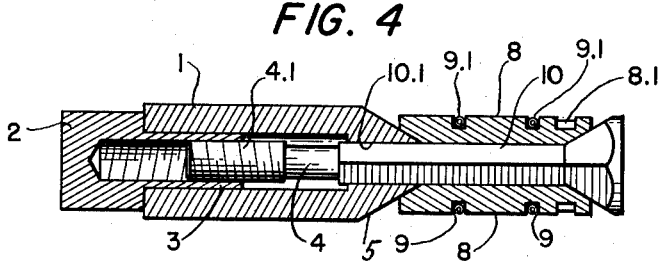
FIG. 4
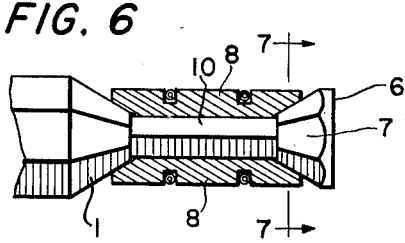
FIG. 6
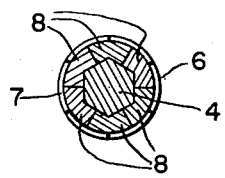
FIG. 7
FIG. 5
Hilbert C. Spahn INVENTOR.
BY Bush & Bush ATTORNEYS

2,601,419

UNITED STATES PATENT OFFICE 2,601,419

EXPANDING MANDREL

Hilbert C. Spahn, Kewanee, Ill.

Application November 14, 1949, Serial No. 127,223

18 Claims. (Cl. 279—2)

My invention relates to an improvement in expanding mandrels of the general type shown in Letters Patent No. 2,226,078 issued to me on December 24, 1940.

Difficulty has been experienced in the use of such mandrels by reason of the tendency of the adjustable gripping bars to twist when the mandrel is applied to a pipe or nipple which has become rusted or corroded in place, thereby requiring a large degree of force to remove it.

The objects of my invention are to provide a plurality of adjustable gripping bars supported at both ends equally in all positions of adjustment so that they will be parallel for their full length and cannot be twisted out of line either when used as an internal wrench to remove a nipple or inner section of pipe or when used merely as a mandrel to prevent crushing of the pipe or similar part while being threaded or otherwise cut or machined; to provide a unitary shaft having a hexagonal or other course or stretch polygonal in section arranged to slide longitudinally of a suitable body and to be held against rotary movement relatively to such body by a bore corresponding to such course of the shaft; and to provide a body having a hexagonal longitudinal bore adapted to prevent turning of a corresponding shaft slidably mounted therein.

I attain these objects by the means illustrated in the accompanying drawings, in which—

Figure 1 is a side elevation of a mandrel embodying my invention;

Figure 2 is a cross-section on the line 2—2 of Figure 1;

Figure 3 is a cross-section on the line 3—3 of Figure 1;

Figure 4 is a longitudinal section on the middle line of Figure 1;

Figure 5 is a top or plan view of one of the gripping bars;

Figure 6 is a longitudinal view of an alternate form showing the gripping bars in section;

Figure 7 is a section on the line 7—7 of Figure 6.

Similar numerals refer to similar parts throughout the several views.

My implement includes a hexagonal body 1 with a bore extending lengthwise thereof. One course or portion of the bore 10.1 is hexagonal in section to fit closely upon the hexagonal course or part 10 of a shaft 4 slidably mounted in the bore and with one course or portion of the bore cylindrical in section and carrying a rotatable internally threaded sleeve 3 having a knurled head 2 united thereto at the rear end of the body in mesh with a threaded course or part 4.1 of the shaft 4. The shaft 4 is mounted in the body 1 and arranged to travel longitudinally thereof as the knurled head 2 and sleeve 3 are rotated in one direction or the other.

At the opposite or front end of the shaft 4 a head 6 is rigidly united thereto as by welding or other means or may be formed integral therewith. The front face of the head 6 is preferably flat but the inner face of the head 6 is formed with a plurality, preferably six, of flat inclined planes extending downwardly to the rear corresponding to similar flat faces formed upon the front ends of the gripping bars.

The front end of the body 1 has a plurality of similar flat planes formed thereon and inclined in the opposite direction.

Upon the inclined faces of the head and body, I mount a corresponding plurality of gripping bars 8. The ends of the gripping bars 8 are inclined to correspond with the inclination of the inclined face segments described and the outer surfaces of the gripping bars are formed with small teeth adapted to engage and grip the inner surface of the nipple or pipe in which the gripping bars may be inserted.

A good form of surface for that purpose is one corresponding to the face of a crosscut file, but other forms of teeth may be utilized as desired for different classes of materials and may be arranged in straight lines or in spiral form.

In two or more of the bars on opposite sides of the mandrel, notches 8.1 may be cut so as to engage and fit objects having internal lugs.

In Figures 1 to 5 I have shown gripping bars arranged to seat upon the flat planes of the opposite head and body faces, but in Figures 6 and 7 I have shown an alternate form in which the gripping bars are formed and mounted so as to ride upon the angles or ridges between those flat planes. Either form may be utilized as desired and while the first form is simpler to manufacture, the second form will provide a somewhat greater stability of the gripping bars.

Circumferential grooves 9 extend around the outer faces of the gripping bars and small coiled springs 9.1 are inserted therein and act to draw the gripping bars together when the shaft 4 is moved forwardly on the body 1 so as to release the gripping bars from the nipple or pipe section which they have contacted.

In the operation of my device, the knurled head 2 is rotated so as to drive the shaft 4 forwardly and allow the gripping bars 8 to be retracted. The head and gripping bars are inserted in the nipple or pipe to be removed or in a pipe to be reenforced to guard against crushing or distortion while the pipe is being threaded, cut or otherwise machined.

The knurled head 2 is then rotated so as to draw the shaft 4 rearwardly thereby causing the head 6 to approach the body 1 and the inclined faces 5 and 7 will force the gripping bars 8 outwardly into contact with the nipple or pipe desired to be engaged. This will reenforce a pipe so as to prevent crushing or distortion and if intended to be used to remove a nipple or other cylindrical pipe retained in a larger pipe or holder, a wrench can be applied to the hexagonal body 1 and the body turned so as to carry with it the shaft 4 and the head 6. In this way the gripping bars 8 will be held in parallel longitudinal lines and no twisting or distortion or upsetting of them can occur.

The same procedure will be applicable whether the gripping bars are formed as shown in Figure 3 or in Figure 6, but in Figure 6 the fact that the bars are riding upon the angles between adjacent faces of the head and body will give increased firmness and stability to the gripping bars.

My apparatus is designed to be made in various sizes to fit various articles to which it may be applied. For smaller nipples or pipes, a good size will be designed to provide a radial expansion of the gripping bars of approximately one-quarter of an inch, but for larger sizes a greater expansion may be provided.

It is obvious that other forms of shafts, faces and gripping bars may be utilized. Thus the angular section of the shaft and bore may be either square, hexagonal, octagonal or other form as desired.

Various modifications may be made in the form, size and arrangement of the parts without departing from the spirit of my invention and I do not limit my claims to the precise forms shown in the drawings.

I claim:

1. An expanding mandrel including a hexagonal body with a longitudinal bore formed therein, said bore having a cylindrical course at one end thereof and a hexagonal course at the other end thereof, a sleeve rotatably mounted in the cylindrical course of the bore having a knurled head united thereto, a shaft slidably mounted in said bore having external threads formed upon a portion thereof adapted to mesh with internal threads formed on the sleeve, an adjoining section of said shaft being hexagonal in section and corresponding in size and shape with the hexagonal section of the bore, said shaft extending forwardly from the body and having a head united to the outer end of the shaft, a plurality of oblique flat plane surfaces formed upon the inner side of said head, a corresponding plurality of oblique flat plane surfaces formed upon the outer end of the body, and a plurality of parallel gripping bars having flat inclined planes formed upon the ends thereof complementary to the planes on the head and body.

2. In an expanding mandrel, a body with a longitudinal bore formed therein, said bore having a cylindrical course at the rear end thereof and a hexagonal course at the front end thereof, a sleeve rotatably mounted in the cylindrical course of the bore having an external head united thereto, a shaft slidably mounted in said bore having threads formed upon a portion thereof adapted to mesh with internal threads formed on the sleeve, said shaft extending forwardly from the body and having a head united to the front end thereof, a plurality of parallel gripping bars surrounding the shaft between the head and the front end of the body, and means actuated by the shaft for expanding the gripping bars.

3. An internal pipe wrench including a hexagonal body, a longitudinal bore formed therein, said bore having a cylindrical course at the rear end thereof and a hexagonal course at the front end thereof, a sleeve rotatably mounted in the cylindrical course of the bore having an external head united thereto, a shaft slidably mounted in said bore having threads formed upon a portion thereof adapted to mesh with internal threads formed on the sleeve, said shaft extending forwardly from the body and having a head united to the front end thereof, a plurality of parallel gripping bars surrounding the shaft between the head and the front end of the body, and means actuated by the shaft for expanding the gripping bars.

4. An expanding mandrel as described in claim 2, said means comprising oblique inner faces formed on the ends of the gripping bars adapted to contact and be expanded by oppositely inclined faces formed on the head and front end of the body as the shaft is retracted by rotation of the sleeve.

5. An expanding mandrel as described in claim 2, said means comprising oblique inner faces formed on the ends of the gripping bars adapted to contact and be expanded by oppositely inclined faces formed on the head and front end of the body as the shaft is retracted by rotation of the sleeve in one direction and to be retracted by springs surrounding said bars as the sleeve is rotated in the opposite direction.

6. An expanding mandrel as described in claim 2, said means including oppositely inclined wedging members formed on the inner side of the shaft head and front end of the body adapted to form seats for the correspondingly inclined ends of the gripping bars and to force the bars radially outwardly as the sleeve is rotated to retract the shaft.

7. An expanding mandrel as described in claim 2, said means including oppositely inclined wedging members formed on the inner side of the shaft head and front end of the body adapted to form seats for correspondingly inclined ends of the gripping bars and to force the bars radially outwardly as the sleeve is rotated to retract the shaft.

8. An expanding mandrel as described in claim 2, said means comprising oblique inner faces formed on the ends of the gripping bars adapted to contact and be uniformly expanded by oppositely inclined faces formed on the head and front end of the body as the shaft is retracted by rotation of the sleeve.

9. In an internal pipe wrench, a body with a longitudinal bore formed therein, said bore having a cylindrical course at the rear end thereof and a hexagonal course at the front end thereof, a sleeve rotatably mounted in the cylindrical course of the bore having an external head united thereto, a shaft slidably mounted in said bore having threads formed upon a portion thereof adapted to mesh with internal threads formed on the sleeve, said shaft extending forwardly from the body and having a head united to the front end thereof, a plurality of parallel gripping bars surrounding the shaft between the head and the front end of the body, and means actuated by the shaft for expanding the gripping bars, said means including oppositely inclined wedging members formed on the inner side of the shaft-head and front end of the body adapted to form seats for correspondingly inclined ends of the gripping bars and to force the bars radially outwardly as the sleeve is rotated to retract the shaft.

10. In an expanding mandrel, the combination with a hexagonal body, of a longitudinal bore formed therein, a shaft slidably mounted in said bore extending forwardly from the body and having a head united to the front end of the shaft, a plurality of oblique flat plane surfaces formed upon the inner side of said head, a corresponding plurality of oblique flat plane surfaces formed upon the front end of the body, a plurality of gripping bars having flat inclined planes formed upon the ends thereof complementary to the planes on the head and body and seatable thereon, and manually rotatable threaded means in the bore coacting with similar threads on the shaft to drive the shaft lengthwise in either direction whereby the gripping bars will be uniformly expanded or allowed to contract.

11. In an expanding mandrel, the combination with a hexagonal body, of a longitudinal bore formed therein, a shaft slidably mounted in said bore extending forwardly from the body and having a head united to the front end of the shaft, a plurality of wedging members formed upon the inner side of said head, a corresponding plurality of wedging members formed upon the front end of the body, a plurality of gripping bars having wedging members formed upon the ends thereof complementary to the wedging members on the head and body and seatable thereon, and manually rotatable threaded means in the bore coacting with similar threads on the shaft to drive the shaft lengthwise in either direction whereby the gripping bars will be uniformly expanded or allowed to contract.

12. An expanding mandrel including a hexagonal body with a longitudinal bore formed therein, said bore having a cylindrical course at the rear end thereof and a hexagonal course at the front end thereof, a sleeve rotatably mounted in the cylindrical course of the bore having a knurled head united thereto, a shaft slidably mounted in said bore having external threads formed upon a portion thereof adapted to mesh with internal threads formed on the sleeve, an adjoining section of said shaft being hexagonal in section and corresponding in size and shape to the hexagonal section of the bore, said shaft extending forwardly from the body and having a head united to the front end of the shaft, a plurality of oblique flat plane surfaces formed upon the inner side of the shaft-head, a corresponding plurality of oblique flat plane surfaces formed upon the front end of the body, a plurality of parallel gripping bars having flat inclined planes formed upon the ends thereof complementary to the planes on the head and body and seatable thereon, peripheral grooves formed in the bars and helical tension springs seated in the grooves to contract the bars as and when the shaft is driven forward.

13. An expanding mandrel including a hexagonal body with a longitudinal bore formed therein, said bore having a cylindrical course at the rear end thereof and a hexagonal course at the front end thereof, a sleeve rotatably mounted in the cylindrical course of the bore having a knurled head united thereto, a shaft slidably mounted in said bore having external threads formed upon a portion thereof adapted to mesh with internal threads formed on the sleeve, an adjoining section of said shaft being hexagonal in section and corresponding in size and shape to the hexagonal section of the bore, said shaft extending forwardly from the body and having a head united to the front end of the shaft, a plurality of oblique flat plane surfaces formed upon the inner side of the shaft-head, a corresponding plurality of oblique flat plane surfaces formed upon the front end of the body, a plurality of parallel gripping bars having inclined angular grooves in the ends thereof corresponding to and seatable and slidable upon the ridges or angular junctions of the adjoining edges of the planes of the shaft-head and front end of the body, peripheral grooves formed in the bars, and helical tension springs seated in the grooves to contract the bars as and when the shaft is driven forward.

14. In a combined mandrel and socket wrench, the combination with a body having a longitudinal bore formed therein, of a shaft mounted in said bore and longitudinally adjustable therein, and means formed integral with the shaft to coact with means formed in the bore to prevent rotation of the shaft relative to the bore.

15. In a combined mandrel and socket wrench, the combination with a body having a longitudinal bore formed therein, of a shaft mounted in said bore and longitudinally adjustable therein, and means formed integral with the shaft to coact with means formed in the bore to prevent rotation of the shaft relative to the bore, said shaft extending forwardly from the body and having a head united to the outer end of the shaft, a plurality of rearwardly inclined surfaces formed upon the inner side of said head, a corresponding plurality of inclined surfaces formed upon the outer end of the body, and a plurality of parallel gripping bars having corresponding inclined surfaces formed upon the ends thereof to coact with the inclined surfaces on the head and body whereby the gripping bars may be expanded.

16. The combination as described in claim 14, said shaft extending forwardly from the body, and means as described formed upon the shaft and front end of the body adapted to coact with corresponding means as described formed upon a plurality of gripping bars seated thereon around the shaft whereby the gripping bars may be uniformly expanded while held parallel to the axis of the shaft.

17. The combination as described in claim 14, said shaft extending forwardly from the body, a plurality of parallel gripping bars surrounding said shaft extension, and means as described united to the shaft and to the forward end of the body adapted to coact with corresponding means formed integral with the gripping bars to expand the gripping bars uniformly as and when the shaft is retracted.

18. In a combined mandrel and socket wrench, the combination with a body having a longitudinal bore formed therein, of a shaft mounted in said bore and longitudinally adjustable therein by threads formed upon a portion of said shaft in mesh with internal threads formed upon a manually rotatable sleeve mounted in said bore at the rear end of the body, and means formed integral with the shaft to coact with means formed in the bore to prevent rotation of the shaft relative to the bore.

HILBERT C. SPAHN.

REFERENCES CITED

The following references are of record in the file of this patent:

UNITED STATES PATENTS

| Number | Name | Date |
|---|---|---|
| 101,134 | Kline | Mar. 22, 1870 |
| 581,209 | Hughes | Apr. 20, 1897 |
| 967,175 | Demarchi | Aug. 16, 1910 |
| 1,231,743 | Johnston | July 3, 1917 |
| 1,468,270 | Kent | Sept. 18, 1923 |
| 1,813,567 | Delorme | July 7, 1931 |
| 2,226,078 | Spahn | Dec. 24, 1940 |